Feb. 17, 1942.  E. G. BLACKLEDGE  2,273,014
SICKLE GUARD APPLIANCE
Filed Aug. 22, 1939
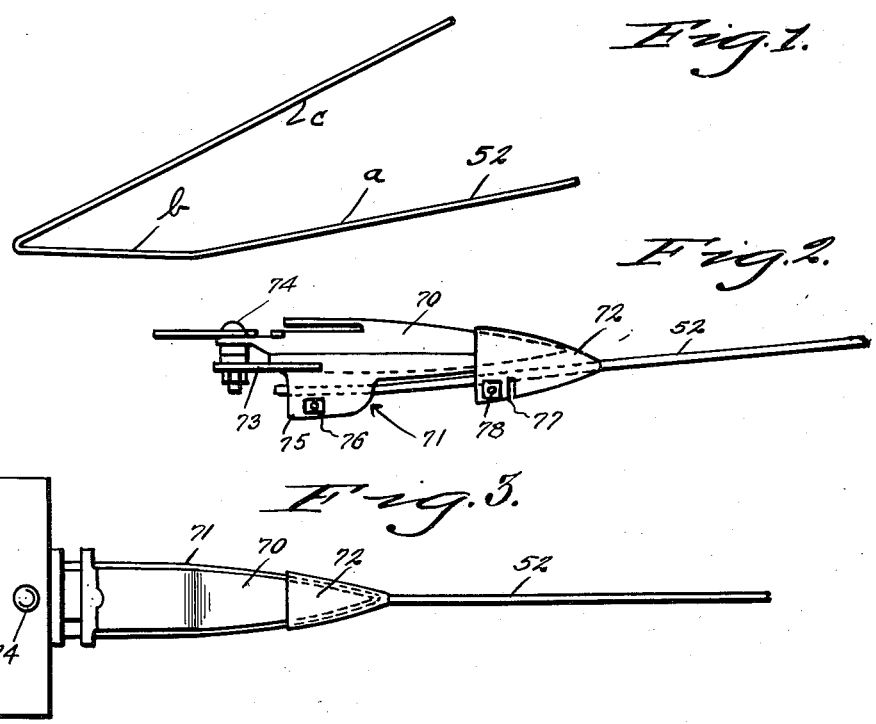
Inventor
Elmer G. Blackledge
By Clarence A. O'Brien
and Hyman Berman
Attorneys Patented Feb. 17, 1942

2,273,014

UNITED STATES PATENT OFFICE 2,273,014

SICKLE GUARD APPLIANCE

Elmer G. Blackledge, Oswego, Kans.

Application August 22, 1939, Serial No. 291,439

3 Claims. (Cl. 56—313)

This invention appertains to new and useful improvements in agricultural machines and more particularly to a sickle guard attachment.

The principal object of this invention is to provide an appliance of the character stated which can be easily applied to sickle guard teeth and which will remain in place under all and varying conditions.

Another object of the invention is to provide an appliance of the character stated in which the parts are constructed to permit a wide range of adjustability and adaptability to the conditions under which it must operate.

These and various other important objects and advantages of the invention will become apparent to the reader of the following specification.

In the drawing:

Figure 1 is a side elevational view of one of the tines.

Figure 2 is a side elevational view.

Figure 3 is a top plan view of the structure shown in Figure 2.

Referring to the drawing wherein like numerals designate like parts it can be seen that numeral 56 denotes a tine which consists of the straight portion a the slightly inclined forward portion b and the backwardly disposed straight portion c which terminates just above the sickle assembly 11. This structure is clearly shown in Figure 1.

Figures 2 and 3 show means for clamping one of these tines 52 directly to a toothed guard 70 and in this case the clamping means consists of a pair of members 71 and 72 the member 71 engaging the underside of the member 70 and having side parts extending up the sides of the guard 70 and a plate 73 extends rearwardly from the member 71 and has a hole therein for receiving a bolt 74 depending from the rear end of the guard 70 and forming part of the means for connecting the guard to the cutter assembly of the machine. The member 71 is formed with depending gripping jaws 75 for receiving an end portion of the tine and these jaws are caused to grip the said end portion by the bolt 76. The member 72 is made in the form of a pointed cap and fits over the pointed end of the guard and a portion of the front end of the member 71. This member 72 is formed with the jaw parts 77 through which a bolt 78 passes so that by tightening the bolt these parts 77 will grip another portion of the tine 52 and thus the tine is clamped to the guard 70 by the clamping means 71 and 72 as shown in Figures 2 and 3.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A lifting finger attachment for sickle guard teeth comprising a hollow cup-like structure adapted to embrace the lead end of a guard tooth and being split at its lower portion and formed to define a pair of jaw members, contracting means between the jaw members, an elongated tine extending longitudinally through the cup-like structure and adapted to be clamped in position by the jaws, and anchoring means for anchoring the rear portion of the tine to a guard tooth.

2. A lifting finger attachment for sickle guard teeth comprising a hollow cup-like structure adapted to embrace the lead end of a guard tooth and being split at its lower portion and formed to define a pair of jaw members, contracting means between the jaw members, an elongated tine extending longitudinally through the cup-like structure and adapted to be clamped in position by the jaws, and anchoring means for anchoring the rear portion of the tine to a guard tooth, said anchoring means consisting of a pair of side members adapted to extend longitudinally and engage opposite sides of a guard tooth, the forward end portions of the side members extending into the cup-like structure, and contracting means between the rear portions of the side members for contracting portions of the said side members against the rear portion of the tine.

3. An attachment for sickle guard teeth comprising a cup-like member adapted to receive the forward end of a guard tooth, a tine extending through the cup-like structure and forwardly thereof, said cup-like structure being provided with contractible means for clamping the tine against movement through the cup-like structure.

ELMER G. BLACKLEDGE.